United States Patent [19]

Chucta

[11] Patent Number: 4,669,047
[45] Date of Patent: May 26, 1987

[54] AUTOMATED PARTS SUPPLY SYSTEM

[75] Inventor: Michael Chucta, Battle Creek, Mich.

[73] Assignee: Clark Equipment Company, South Bend, Ind.

[21] Appl. No.: 591,444

[22] Filed: Mar. 20, 1984

[51] Int. Cl.[4] .............................. G06F 15/46
[52] U.S. Cl. .................................. 364/468; 364/478; 364/424; 414/136; 414/231; 414/274; 414/331; 104/88
[58] Field of Search ............... 364/468, 469, 478, 479, 364/424; 414/273, 274, 331, 134, 136, 231; 29/33 P, 563, 568; 104/88; 221/11, 68; 198/341, 356, 358

[56] References Cited

U.S. PATENT DOCUMENTS

| | | | |
|---|---|---|---|
| 3,727,756 | 4/1973 | Koluch et al. | 221/68 |
| 3,796,327 | 3/1974 | Meyer et al. | 104/88 |
| 3,880,299 | 4/1975 | Zollinger et al. | 414/273 |
| 3,958,102 | 5/1976 | Burt | 414/273 |
| 4,053,741 | 10/1977 | Ainoya et al. | 364/478 |
| 4,162,869 | 7/1979 | Hitomi et al. | 414/134 |
| 4,195,347 | 3/1980 | MacMunn et al. | 364/478 |
| 4,237,598 | 12/1980 | Williamson | 364/478 |
| 4,328,545 | 5/1982 | Halsall et al. | 364/478 |
| 4,472,783 | 9/1984 | Johnstone et al. | 364/468 |
| 4,484,289 | 11/1984 | Hemond | 364/468 |
| 4,492,504 | 1/1985 | Hainsworth | 414/273 |

*Primary Examiner*—Jerry Smith
*Assistant Examiner*—John R. Lastova
*Attorney, Agent, or Firm*—Reising, Ethington, Barnard, Perry & Milton

[57] ABSTRACT

An automated parts supply system is disclosed for a manufacturing operation to deliver parts to individual work stations on a "just-in-time" basis. A carrier module with a supply of parts in a set of containers is placed on a computer controlled guided vehicle at a receiving station. A record of module data including the identification, quantity and location of parts in the module is supplied for use in the computer system. The vehicle is automatically controlled to move to successive work stations to deliver parts according to a predetermined schedule and in response to special interrupt requests. The system may include more than one vehicle and each vehicle may be loaded with more than one parts carrier module. An in-plant storage module may be used as a back-up supply source in conjunction with scheduled delivery of parts carrier modules at the plant receiving dock. The computer system processes initially stored delivery schedules and data and incoming real time data from the vehicles and work stations to develop the record of parts locations in the system and to generate transfer commands for controlling the vehicles.

16 Claims, 8 Drawing Figures

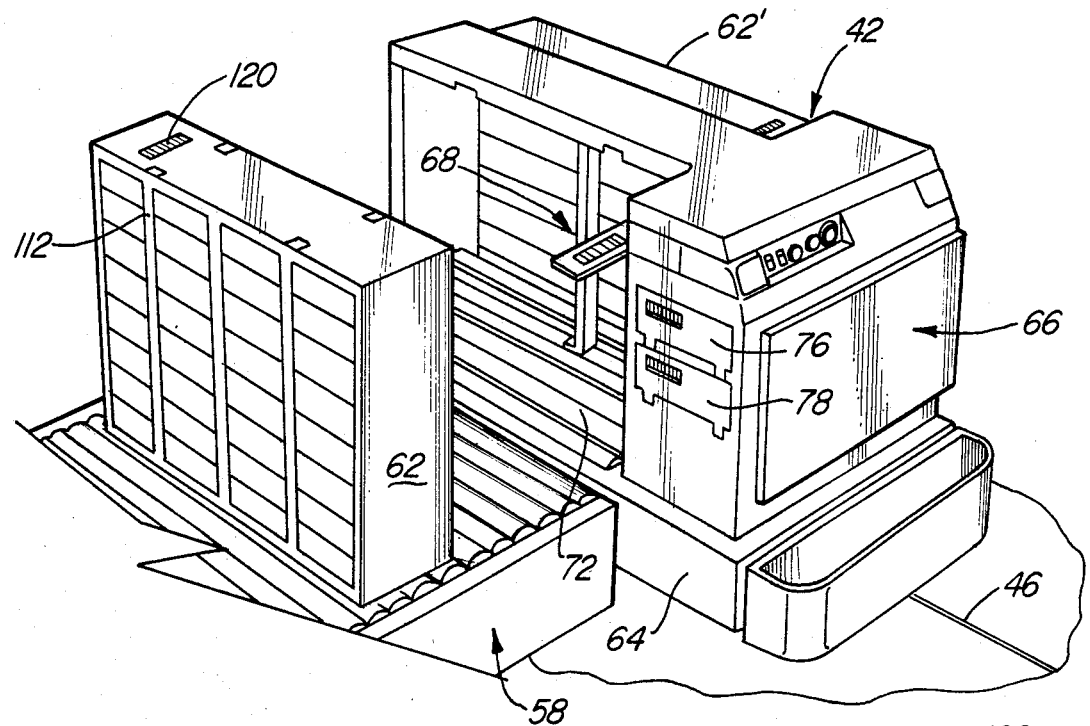
Fig-6
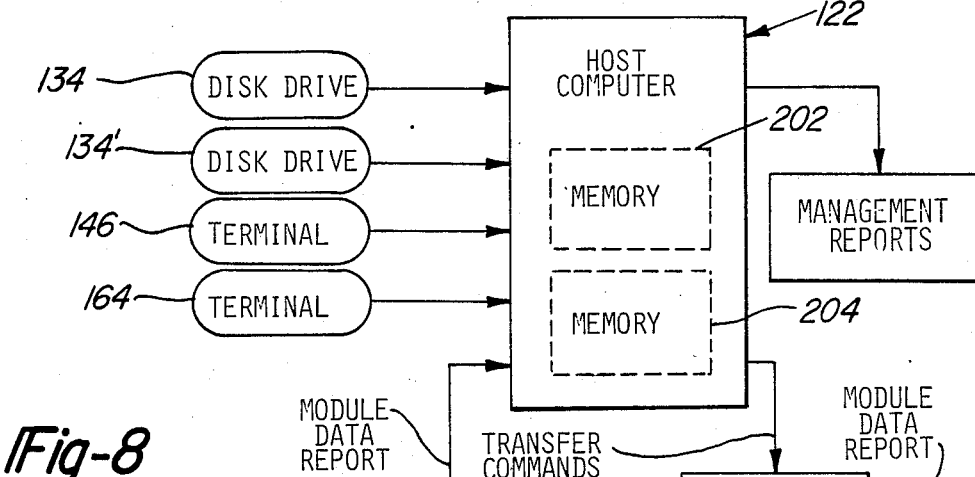
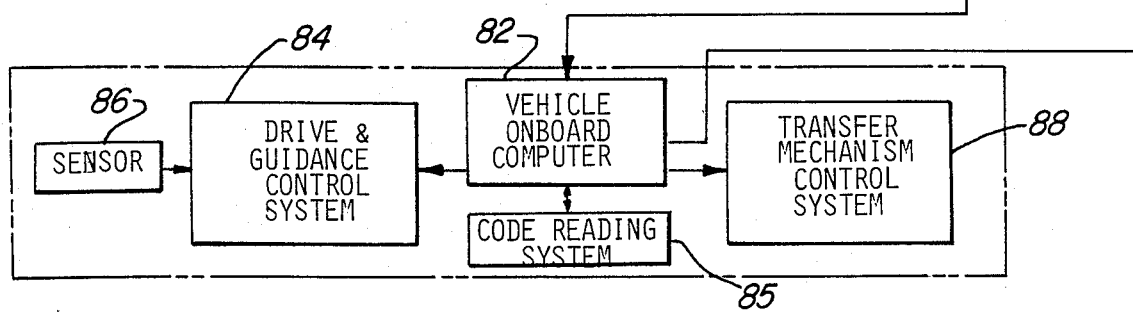
Fig-8

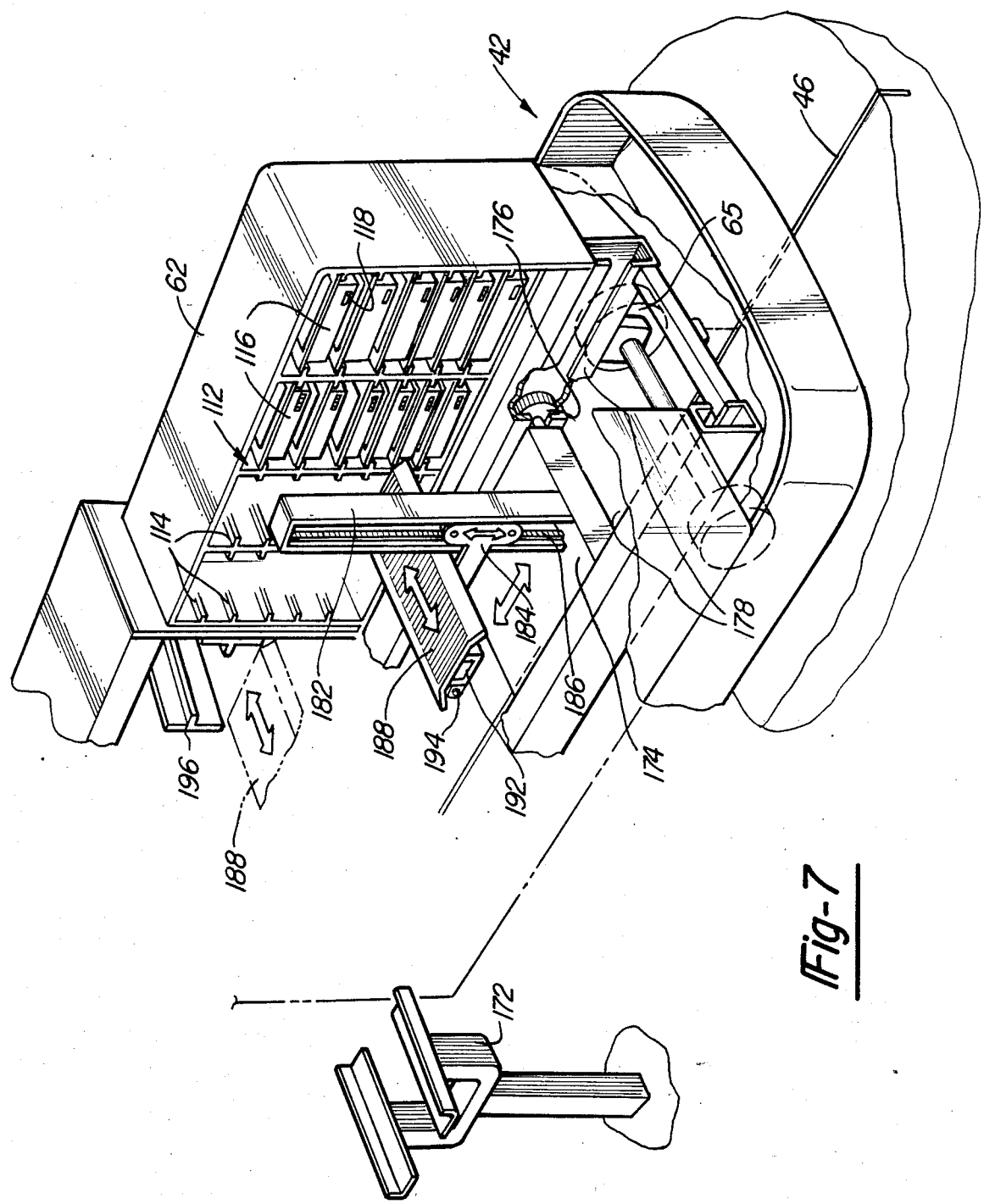

AUTOMATED PARTS SUPPLY SYSTEM

FIELD OF THE INVENTION

This invention relates to materials handling systems; more particularly, it relates to systems for automatically supplying parts to work stations for work in process.

BACKGROUND OF THE INVENTION

In modern day manufacturing facilities, there is a need for an improved parts and materials supply system to minimize inventory and the floor space required for parts storage at the work stations. The efficiency and economy of the so-called "just in time" inventory control system is now well recognized. This inventory control system has the goal of reducing process inventory at work stations as well as back up inventory to levels that will meet the assembly requirements for just a fraction of the work shift. In this system, suppliers deliver incoming materials and parts just prior to assembly or processing time to eliminate the need for in-plant storage on pallets or in bulk containers. There is a need for an automated system which requires small quantities of parts with short term storage and which moves the required parts from known locations to the point of use just prior to the time needed.

Manufacturing systems are known which utilize automatically controlled vehicles for moving work pieces from one work station to another. In the Meyer et al U.S. Pat. No. 3,796,163, a workpiece supply system comprises a closed loop trackway on which one or more cars are supported for movement to various work stations such as numerically controlled machine tools. A car carries a pallet on which a work holding fixture is secured and transports the pallet to a computer selected station. At the selected station, the pallet is automatically removed from the car and placed on a positionable table from which the next workpiece to be supplied to the machine is automatically selected and transferred thereto by computer control.

In the Koluch U.S. Pat. No. 3,727,756 a system is described for supplying articles on demand to a production line for assembly of composite articles in which two components of the article are continuously manufactured at independently variable rates and fed through separate lines which merge with each other at an assembly station. This system includes a bank of individual storage cells for units of one component of the article. A demand accumulator is located between the storage cells and the assembly station to continuously supply units to the assembly station in accordance with the demand rate at which the second components of the article are fed to the assembly station.

A general object of this invention is to provide an improved part supply system which overcomes certain disadvantages of the prior art.

SUMMARY OF THE INVENTION

In accordance with this invention, a computer controlled guided vehicle carries a supply of parts and moves to successive work stations to deposit containers of parts and pick up empty containers on a just-in-time basis. A carrier module with the supply of parts is placed on the vehicle at a receiving station. A record of module data including the identification, quantity and location of parts on the module is supplied for use in the computer system. One or more such vehicles with respective carrier modules is used in the system to deliver parts according to a schedule and in response to special interrupt requests. After the contents of the module have been delivered as required, the vehicle returns the empty module to the receiving station and picks up another module with its record of module data for use in the computer system.

Further, in accordance with this invention, a carrier module is provided at a receiving station for loading onto a computer controlled vehicle. The carrier module includes a set of parts containers each of which contains a quantity of parts. Certain carrier module data is recorded including the identification codes of the carrier module and the parts and the quantity of parts at each compartment address. The carrier module data is recorded on a machine readable recording medium which is read into the computer system for storing it in memory. The quantity of parts at each work station is communicated to the computer system. The computer system is provided with data including the quantity of parts which would be normally used per unit of time at each work station. The computer system is programmed for controlling the vehicle to move to the work stations according to a schedule for delivering selected containers to selected stations before the quantity of parts at any station is depleted below a predetermined minimum. The vehicle is operated under computer control to deposit selected containers in accordance with the schedule and to pick up selected containers and place them in the module. The operator at a work station may transmit an interrupt request to the computer system to signal a parts shortage and the program is interrupted to control the vehicle to deliver the specified parts on a priority basis.

Further, in accordance with this invention, an inplant storage module may be provided for supplementing the inventory of parts in the carrier modules. Storage module data, including part identification codes, quantity and compartment addresses, is provided on a machine readable medium which is read into the computer system. The computer system is programmed to determine the quantity and location of each part so that an interrupt request from any work station can be satisfied by causing the vehicle to pick up the specified part at the storage module and delivering it to the work station. When the system includes two or more vehicles, it may be programmed to move the vehicles adjacent each other for the exchange of an empty container for an non-empty comtainer to facilitate the supply of specified parts to a work station. The computer system is utilized to keep track of the quantity and location of each part in the supply system.

Further, in accordance with this invention, the parts supply system comprises one or more automatically guided vehicles, each adapted to carry one or more carrier modules and to move from a receiving station to plural work stations in succession under the control of a computer system. The carrier module is provided with a set of parts containers for holding a quantity of parts, the location of each container having a unique address in the rack of the module. The vehicle is provided with a container transfer mechanism with a control means responsive to transfer command signals for transferring a specified container from the module to a work station and vice-versa. The computer system comprises a host computer which maintains inventory control data for the entire supply system and generates vehicle guidance command signal for the individual vehicles according to the parts requirements at the work stations. An onboard vehicle computer communicates with the host computer and produces guidance command signals for the vehicle control means and produces transfer command signals for the transfer mechanism control means in response to instructions for the host computer. It also records the location of each container in the module for control of the selection and delivery of this container.

A more complete understanding of this invention may be obtained from the detailed description that follows taken with the accompanying drawings.

DESCRIPTION OF THE DRAWINGS

FIG. 6 is a pictorial view of a receiving station showing a carrier module being loaded by conveyor onto parts supply vehicle;

FIG. 7 is a pictorial view of a transfer mechanism on a vehicle; and

FIG. 8 is a block diagram of the computer system.

BEST MODE FOR CARRYING OUT THE INVENTION

Figure 1:
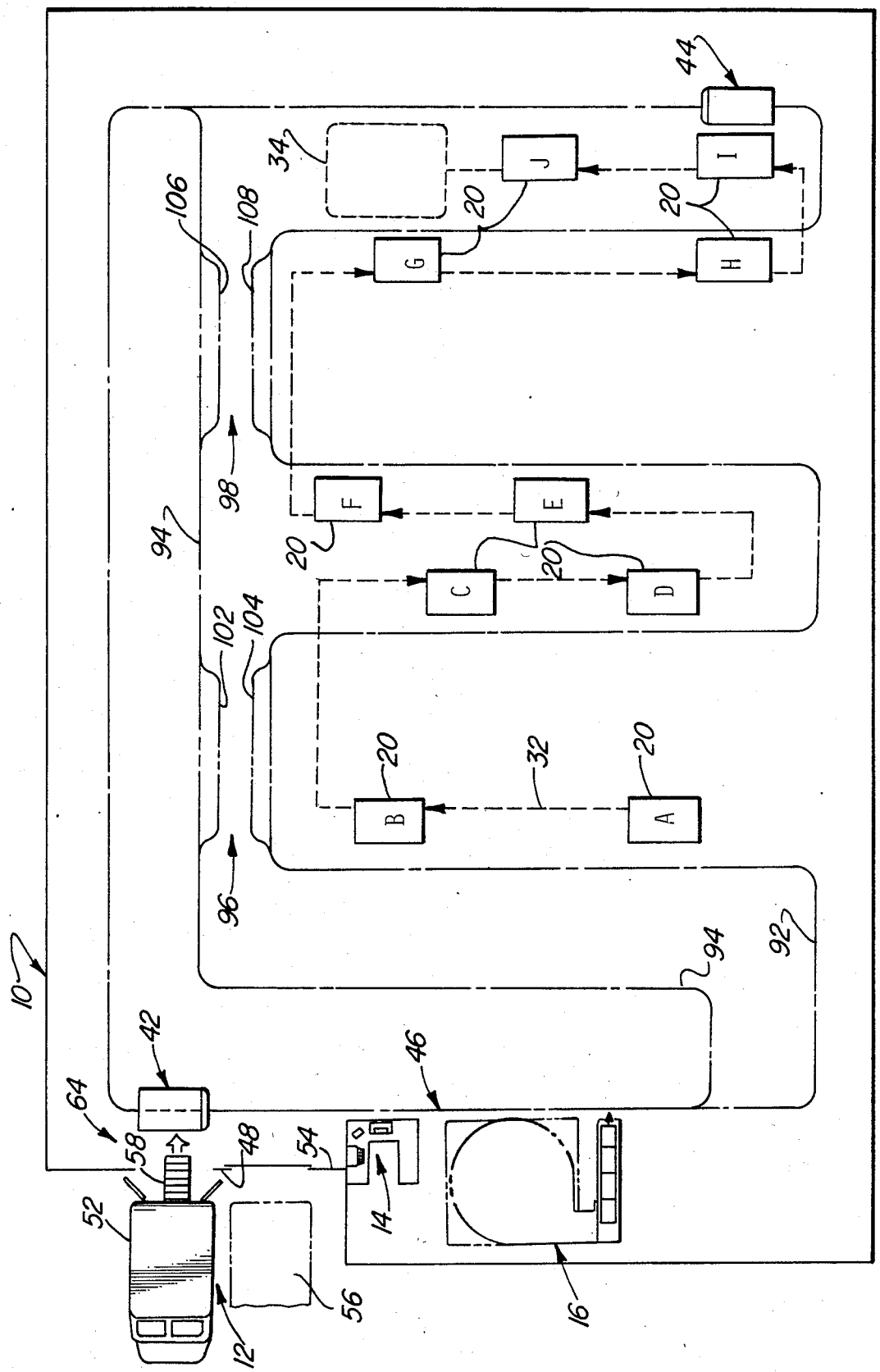
FIG. 1 is a diagrammatic plan view of parts supply system according to this invention.

Referring now to the drawings, there is shown an illustrative embodiment of the invention in a "just-in-time" parts supply system for a manufacturing plant in which a product is assembled from a number of small individual parts of subassemblies. The manufacturing operation utilizes multiple work stations in which one or more parts are assembled. In this embodiment, the work stations are located on a single floor of a plant and are supplied with parts by two parts supply vehicles. Parts are supplied to the system in parts carrier modules by outside suppliers on a time scheduled basis and from an optional in-plant storage unit. The supplier may also operate such a "just-in-time" system using the same modules and vehicles. It will be appreciated as the description proceeds that the invention is useful in many different applications and may be embodied in different forms.

FIG. 1 shows a layout diagram of a parts supply system for a typical manufacturing plant. The parts supply system serves an assembly line which is located on the one floor 10 of the manufacturing plant. The system comprises, in general, a receiving and shipping dock 12, a data entry station 14, an in-plant storage module or unit 16 and a plurality of work stations 20 at which parts are assembled. Stations 20 are also labeled A through J for further identification. A conveyor 32 extends serially between the work stations for the transport of subassemblies from one station to the next. The conveyor 32 carries the assembled product from the work station J to a staging or temporary collection area 34. The supply system also comprises a pair of computer guided vehicles 42 and 44 which are movable on a guidepath system 46 to deliver parts to the work stations.

The receiving and shipping dock 12, as shown in FIG. 1, comprises a receiving doorway 48 with a delivery truck 52 backed-up to the doorway. It also comprises a shipping doorway 54 with a space 56 for another truck. A conveyor 58 is provided for transferring parts carrier modules 62 from the truck to the guided vehicle 42 which is positioned at the receiving station 64.

At the receiving station 64, as shown in FIG. 6, the vehicle 42 is stopped on the guidepath 46 adjacent the end of the conveyor 58. The vehicle 42 comprises, in general, an undercarriage 64 which carries the running gear including traction wheel 65 (see FIG. 7) and a pair of dirigible wheels (not shown). The vehicle also includes a body 66 and a transfer mechanism 68. The transfer mechanism 68 is located behind the body 66 in a fore-and-aft aisle of the vehicle. Left-hand and right-hand load carrying decks 72 are located outboard of the transfer mechanism 68. The right-hand load carrying deck 72 is adapted to receive a carrier module 62 in operative relationship with the transfer mechanism 68. The left-hand deck (not shown) is adapted to receive a carrier module 62'. The transfer mechanism 68 is comprised of a small stacker crane which coacts between the delivery/receiving port 76 and a delivery/receiving port 78 in the vehicle body 66. The vehicle is provided with a pair of such ports on both the right-hand and the left-hand sides. The transfer mechanism 68 will be described in greater detail subsequently. The body 66 of the vehicle also carries the vehicle control system. As shown in the block diagram of FIG. 8, this comprises an onboard vehicle computer 82 which is a part of the computer system which will be described subsequently. The vehicle control system also includes a vehicle drive and guidance control system 84 which receives input signals from a guidepath sensor 86 and also receives control or vehicle command signals from the onboard vehicle computer 82. The control system includes a container code reading system 85 which will be described subsequently. Also, the control system includes a transfer mechanism control system 88 which receives control or transfer mechanism command signals from the computer 82. The drive and guidance control system 84 is operative to control the drive direction of the traction motor and the vehicle braking for movement of the vehicle along the path of the guidepath 46 as detected by the sensor 86. It is noted that the guidepath 46 includes an outer path 92 which extends from a receiving station 64 past all of the work stations A through J in succession and returns to the receiving station. It also includes an inner path 94 which extends from the receiving station 62 through a first transfer station 96 and a second transfer station 98 and returns to the receiving station. At the transfer station 96 a siding path 102 extends from the path 94 and a siding path 104 extends from the path 92. The siding paths 102 and 104 are spaced closely together so that two vehicles on the respective siding paths are positioned adjacent each other for transfer of parts therebetween, as will be described subsequently. Similarly, the transfer station 98 includes a siding path 106 extending from path 94 and it includes a siding path 108 extending from the path 92 for purposes of transfer between vehicles.

The carrier module 62 is best shown in FIGS. 6 and 7. It comprises a frame or rack 112 which is divided into separate compartments 114 which are disposed in an array of plural columns and plural rows. Each compartment 114 is adapted to receive a removable parts container 116. Each parts container 116, suitably in the form of a tray, is adapted to hold a plurality of parts, all of which may be of the same kind or there may be a mix of different kinds of parts. Each container carries a code label 118 bearing a bar code which identifies the particular container. Parts of the same kind have the same parts identification number, i.e. part number, and the container code constitutes the address of that part number in the module. The module 62 is suitably identified by a module identification number which, along with certain module data, is recorded on a machine readable record medium, preferably a floppy disk 120 which accompanies the module. The module data includes the part identification code of the parts in each container, the quantity of each kind of part therein, and the container identification code. This module data record is unique for each carrier module, and as will be described subsequently, the data is entered into the computer system for inventory control.

The computer system is shown in FIG. 8. In general, it comprises a host computer 122 which is suitably a general purpose computer and may be the central computer used in the manufacturing facility for other control purposes and data processing. The host computer serves as the central control for the entire parts supply system. In general, the host computer keeps track of the quantity and location of all parts in the system including the parts in the carrier module of the vehicles, the parts in the inplant storage unit, and the parts on hand at the work stations. It maintains an updated inventory and stock location record in real time during operation of the supply system. The host computer also stores information as to the schedule for use and the parts requirements at each work station. This includes the normal rate of usage of parts per unit time and the minimum number of parts required to be on hand at each work station to insure continuity of production. The host computer develops a delivery schedule in terms of the required clock time of deposit of parts containers at each of the work stations. It downloads transfer commands for causing the vehicles to move from station-to-station on the required schedule and to identify the parts containers which are to be deposited at and picked up from each station in accordance with the delivery schedule. The host computer also processes interrupt requests from individual work stations calling for missing parts or replacement of defective parts on a priority basis. The host computer may also be used to prepare management reports such as work station performance and the like.

Where the manufacturing facility includes more than one assembly operation, the host computer 122 may be used as the central control over separate parts supply systems each of which serves an assembly operation. In such case, it may be desirable to utilize a floor control computer 124 for each individual parts supply system to communicate between the host computer 122 and the onboard vehicle computer 82. The floor control computer 124 receives the transfer commands in accordance with the delivery schedule and produces transfer commands for the individual vehicles. It receives data from the individual vehicle and transmits it to the host computer.

The computer system also includes the onboard vehicle computer 82 as discussed above. The vehicle computer, suitably a microcomputer, functions to process module data and exercise local control over the vehicle drive and guidance system and the transfer mechanism. In performing this function, it receives transfer commands from the host computer or the floor control computer calling for deposit and pick up of parts containers at the work stations and also the exchange of containers between vehicles. The vehicle computer also updates the module data on a real time basis and reports the updated data to the floor control computer or the host computer. The computer system will be described in greater detail subsequently.

Figure 3:
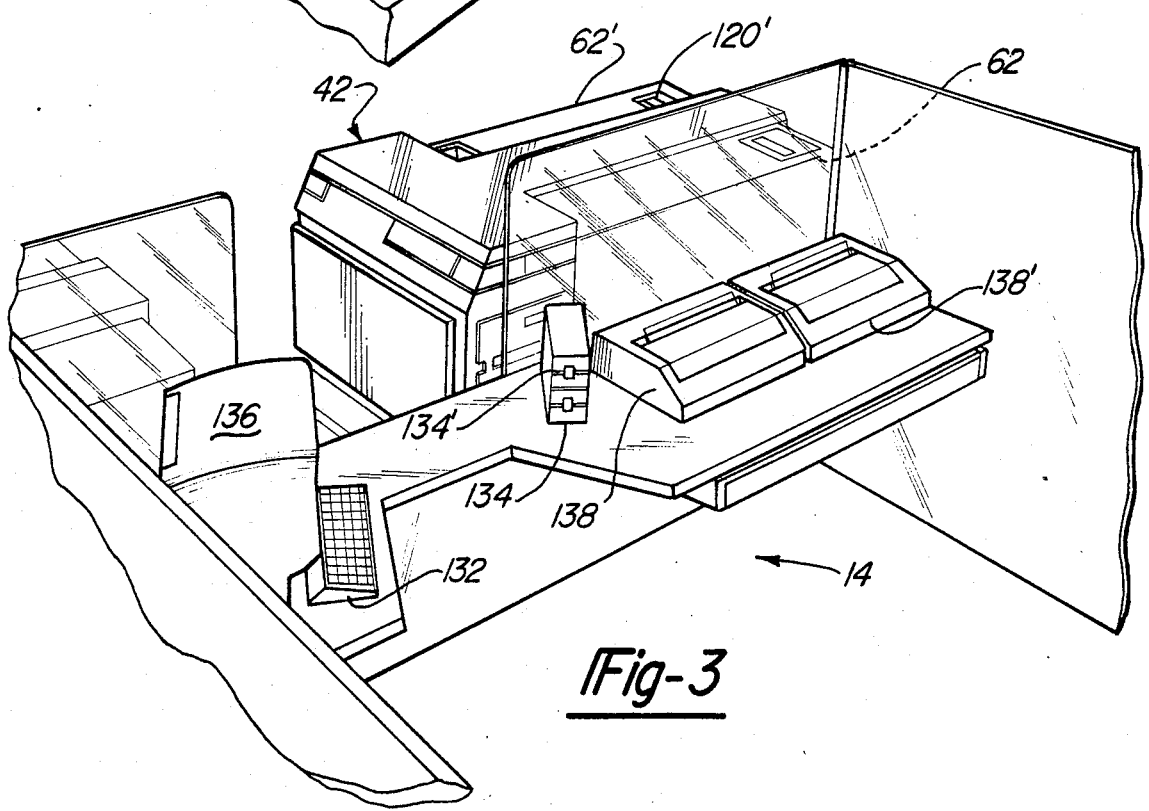
FIG. 3 is a pictorial view of a data entry station for reading carrier module data into the computer system.

The data entry station 14 is shown in FIG. 3. The vehicle 42 with parts carrier modules 62 and 62' on board is stopped at the data entry station for entry of the module data into the computer system. For this purpose, the data entry station is provided with a computer terminal including a keyboard 132, a pair of disk drives 134 and 134' and a monitor 136. The station is also provided with a pair of printers 138 and 138'.

As described above, the module data for the carrier module 62 is recorded on the floppy disk 120. It includes the module identification number, the parts container identification numbers in the module, the part identification numbers for each container and the quantity of each kind of part in each container. Similarly, the module data for module 62' is recorded on the floppy disk 120'. The module data is entered into the computer system by running the floppy disks 120 and 120' on the disk drives 134 and 134' together with required input on keyboard 132. Thus, the module data and the vehicle identificatin number on which the module is installed is communicated to the host computer 122. A hard copy of the module data is provided by print out on the printers 138 and 138'.

Figure 5:
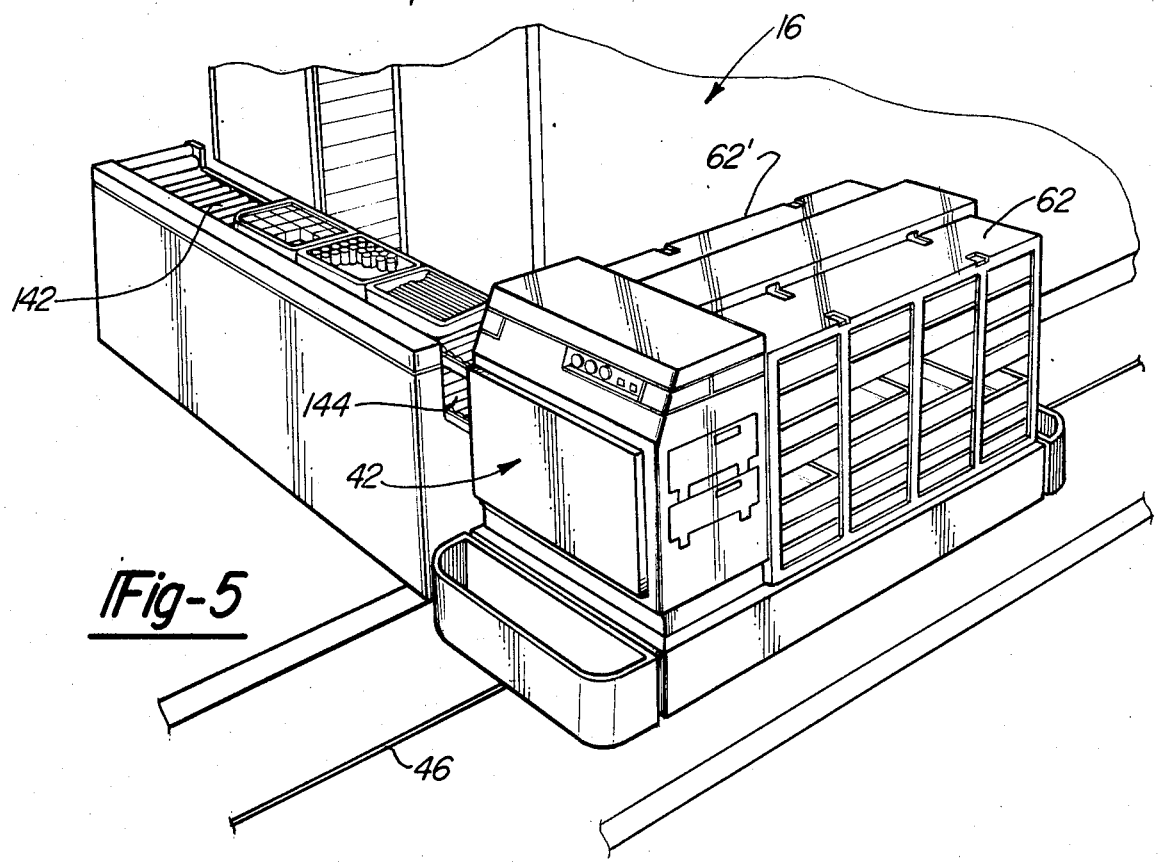
FIG. 5 is a pictorial view of an in-plant storage module with a parts supply vehicle receiving parts containers therefrom.

The in-plant storage unit 16 is shown in FIG. 5. As shown, the vehicle 42 with modules 62 and 62' onboard is positioned at the storage unit for pick up of any additional parts containers. The storage unit 16, suitably in the form of an automated mini-storage system or carrousel, includes an upper level roller conveyor 142 for delivery of parts containers to the upper delivery/receiving port of the vehicle. It also includes a lower level conveyor 144 for receiving empty parts containers from the lower delivery/receiving port of the vehicle. The inplant storage unit 16 is provided with a data input terminal 146, suitably a keyboard, in the computer system as shown in FIG. 8. Thus, the module data for the carrier module 62' is updated to include the container identification numbers and the parts identification numbers and quantities in each container loaded into the module at the storage unit 16. This will be discussed further with reference to FIG. 8.

Figure 2:
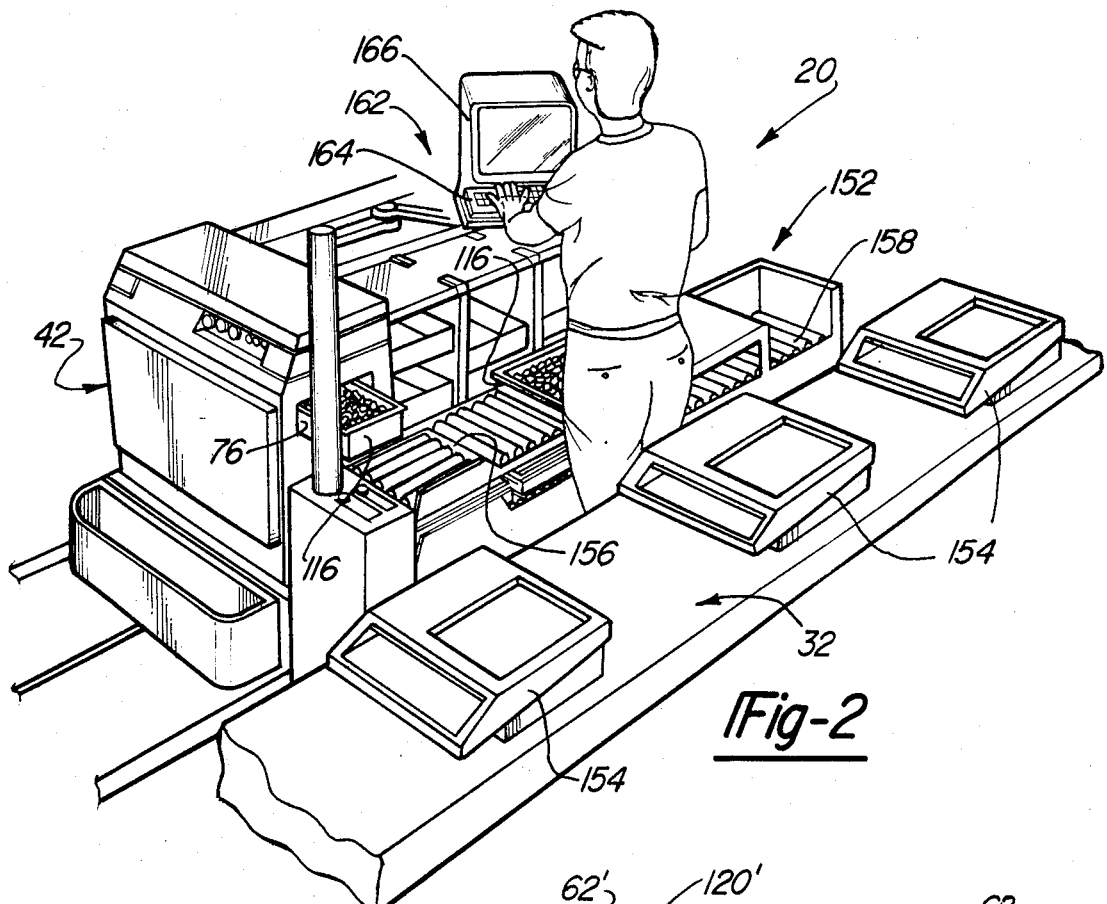
FIG. 2 is a pictorial view of a work station with a parts supply vehicle transferring a container of parts.

FIG. 2 shows an example of the work stations 20. As shown in FIG. 2, the vehicle 42 is stopped at the work station for deposit and pick up of selected parts containers 116. It is noted that the work station includes a parts supply console 152 and the conveyor 32. The conveyor 32 carries workpieces 154, such as subassemblies of an electronic product, into and out of the workstation 20. The operator at the station selects a specified part or parts from the appropriate parts container on the console 152 and performs the necessary operation to make it a part of the workpiece 154. The console 152 comprises a receiving conveyor 156 at the upper level of the console which is aligned with the delivery/receiving port 76 so that a parts container 116 may be deposited thereon. When all of the parts from a parts container 116 have been used, the empty container is placed on a return conveyor 158 which is disposed at a lower level on the console 152 under the receiving conveyor 156.

The return conveyor 158 is aligned with the delivery/receiving port 78 (not shown in FIG. 2) of the vehicle 42. The work station 20 includes a computer terminal 162 for use by the operator in communicating with the host computer 122. The terminal 162 includes a keyboard 164 and a monitor 166 which enables the operator to transmit an interrupt request in the event of a special requirement at the work station. In the event of defective parts or other causes of an unexpected parts shortage at the work station, an interrupt request is transmitted to obtain delivery of specified parts on a priority basis, as will be discussed subsequently. This feedback communication link to the host computer 122 for reporting of missing or unusable parts at the individual work stations 20 provides information for the host computer to maintain real time inventory records for each work station. The terminal 162 is primarily used to receive work assignments and to communicate to the host the completion of work assignments.

Figure 4:
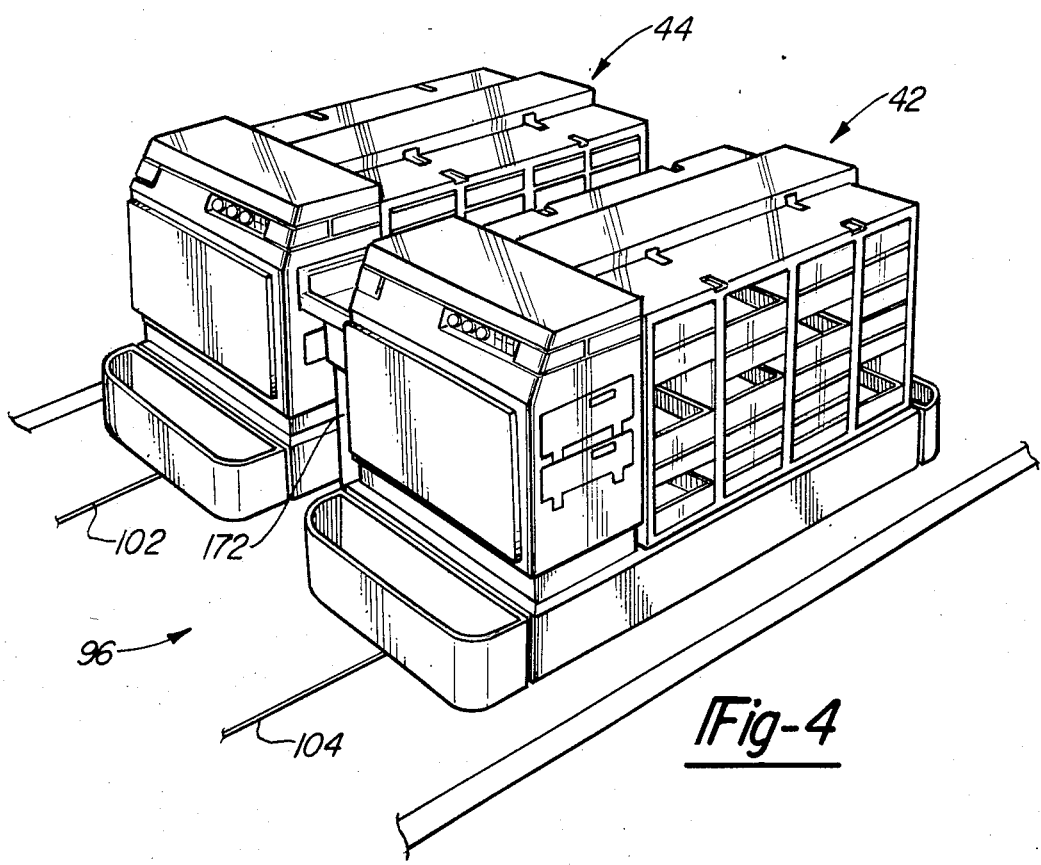
FIG. 4 is a pictorial view of two parts supply vehicles transferring parts containers between vehicles.

FIG. 4 shows the vehicles 42 and 44 stopped in the transfer station 96 for the purpose of exchanging parts containers between the vehicles. A fixed transfer stand 172 (see also FIG. 7) is disposed between the vehicles for coaction with the transfer mechanism 68 which will be described in detail subsequently.

The transfer mechanism 68 is shown in FIG. 7. As described previously, the transfer mechanism 68 is disposed in the central fore-and-aft aisle of the vehicle between the decks 72 and 72' which receive the parts carrier modules 62 and 62'. The transfer mechanism 68 is adapted to operate under computer control to locate any parts container 116 in the module 62 or 62' and transfer it to a work station or another vehicle and it also operates to pick up a parts container from a work station or another vehicle and deposit it in either module 62 or 62'. The transfer mechanism 68 includes a stacker crane which is suitably a small scale version of the type of stacker crane used in automatic warehouses. The crane comprises a carriage 174 which is mounted on a set of wheels 176 movable on rails 178 in the foreand-aft direction of the aisle between the modules 62 and 62'. A mast 182 is mounted on the carriage 174 and a vertical carrier 184 is movable up and down the mast on a track 186. The carrier 184 supports a lateral transfer shuttle 188 through a shuttle drive 192 which is adapted to impart lift and lower movements to the shuttle 188, in addition to the lateral transfer motion, to remove or replace a container 116 in a compartment of a module. The shuttle 188 is provided with a bar code reader 194 on each end for reading the bar code labels 118 on the containers 116. The carriage 174, the carrier 184 and the lateral transfer shuttle 188 are provided with separate drive motors which are controlled by the transfer mechanism control system 88 in response to transfer commands from the onboard vehicle computer 82, as previously described. In response to a transfer command, the transfer mechanism is moved into alignment with the specified compartment for pick up or deposit of the container at that location. A look-up table in the memory of the onboard vehicle computer 82 correlates the container identification number on the bar code label with the compartment address in the module so that the transfer mechanism moves directly to the compartment corresponding to the specified container. The bar code reader 194 may then read the code label of the particular container to verify that it is the right container.

As described above, the vehicle 42 is provided with delivery/receiving ports 76 and 78 on both sides of the body for pick up and deposit of parts containers. As shown in FIG. 7, each port is provided with a deposit/pick up shuttle 196. (Only one shuttle is illustrated, it being understood that a shuttle is provided as a part of each delivery/receiving port. The deposit/pick up shuttle 196 is controlled by the transfer mechanism control system 88 in accordance wtih transfer commands from the onboard vehicle computer 82. The shuttle 196 receives a parts container 116 from the lateral transfer shuttle 188 and delivers it from the port to a work station conveyor or alternatively, the shuttle 196 receives a parts container 116 from a work station conveyor and the lateral transfer shuttle 188 picks up the container and deposits it in a specified compartment on the vehicle. In a similar manner, the parts containers 116 are transferred between two vehicles and also between a vehicle and the storage module.

The computer system, as previously discussed with reference to FIG. 8, comprises the host computer 122, the floor control computer 124 and the onboard vehicle computer 82. The host computer 122 includes a data memory 202 which stores inventory data and information required for computing delivery schedules in real time. Such information includes the normal quantity of parts which will be used per unit time at each work station and the respective identification codes of such parts. The host computer 122 also includes a program memory 204 for operating the computer to process stored and incoming data and interrupt requests on a real time basis for generating transfer commands for the control of the vehicles to meet the required delivery schedule. The host computer 122 receives carrier module data, as described previously, from the disk drive 134 to store data representing the carrier module identification number, the container identification number and the quantity and parts identification number of the parts in each container. Similarly, module data is supplied to the host computer from the disk drive 134' at the data entry station 14. In a similar manner, data is supplied from the terminal 146 at the in-plant storage unit 16. The work station terminals 164 at each of the respective work stations 20 communicates with the host computer to transmit interrupt requests in case of missing or defective parts. Also, module data reports are supplied from the vehicle onboard computer 82 to the floor control computer 124 and thence to the host computer 122. Such module data reports are supplied on a continuing basis in accordance with the transfer of parts containers from a vehicle to a work station or between vehicles. Thus, the host computer 122, under program control, processes the incoming data and initially stored data to produce a real time record of the quantity and location of all parts in the supply system. The host computer generates transfer commands as required to meet the parts delivery schedule and the interrupt requests that may be received. The host computer may also be used to generate management reports of various types regarding the performance of work stations, inventory control, etc. The transfer commands from the host computer 122 are applied to the floor control computer 124 which relays the transfer commands to the onboard vehicle computer 82. The vehicle computer operates under program control to process the transfer commands to develop vehicle commands for the drive and guidance control system 84. the computer also controls the container code reading system 85. It also generates transfer mechanism commands for the transfer mechanism control system 88. Thus, the vehicle is caused to execute the required deposit and pick up operations at the work stations and the transfer operations between vehicles.

Although this invention has been described with reference a particular embodiment, it is not to be construed in a limiting sense. Many variations and modifications will now occur to those skilled in the art. For a definition of the invention reference is made to the appended claims.

What is claimed is:

1. The method of supplying parts for use at plural work stations in accordance with the number of parts at the respective work stations to thereby minimize the need for parts storage, said method comprising the steps of:

providing carrier modules at a receiving station, each carrier module having a set of parts containers and having a carrier module identification code and a compartment for each container, each compartment having a compartment address, each of said containers containing a quantity of parts having part identification codes, recording on a machine readable recording medium certain carrier module data including the carrier module identification code and the part identification codes and the quantity of parts in the container at each compartment address, placing one of said carrier modules on a computer controlled vehicle, reading said recording medium for said one carrier module into a computer system and storing it in a memory thereof, keeping count of the quantity of parts and their identification codes at each work station and communicating said count to the computer system, providing rate-of-use data to the computer system including the normal quantity of parts which is scheduled for use per unit time at each work station and the respective identification codes of such parts, programming the computer system for controlling the vehicle to move to the work stations according to a schedule for delivering selected containers to selected stations before the quantity of parts at any selected station is depleted below a predetermined minimum, said schedule being determined by said programming from said count, said rate-of-use data and said carrier module data, and running the computer system in accordance with said program for operating the vehicle.

2. The invention as defined in claim 1 including the steps of:

selecting a container from said carrier module in accordance with the address in said schedule and depositing it at a work station according to said schedule, and picking up a selected container from the work station and placing it in said module at said address.

3. The invention as defined in claim 1 including the steps of:

transmitting an interrupt request to said computer system from one of said stations for delivery of a quantity of specified parts prior to said schedule, and interrupting said program to control said vehicle to move with priority to said one station to deliver said specified parts.

4. The invention as defined in claim 3 including the step of:

including instructions in said program for controlling said vehicle to return to said receiving station after it has executed any such interrupt request and said delivery schedule, and replacing said carrier module with another carrier module.

5. The invention as defined in claim 1 including the steps of:

loading a storage module with a set of parts containers, said storage module having a compartment for each container and each compartment having a compartment address, recording on a second machine readable medium certain storage module data including the part identification code and the quantity of the parts in the container at each compartment address, reading the storage module data from said second recording medium into the computer system and storing it in a memory thereof, providing a program for the computer system for determining from said carrier module data, storage module data and said count, the quantity and location of parts having the same part identification code, transmitting an interrupt request to said computer system from one of said stations for delivery of a quantity of specified parts prior to said delivery schedule, and interrupting said program to control said vehicle to move to said storage module to pick up a container of said specified parts and to deposit it at said one station.

6. The invention as defined in claim 1 including the steps of:

placing another of said carrier modules on a second computer controlled vehicle, each of said vehicles having a vehicle identification code, reading said recording medium for said second carrier module into said computer system and storing it in said memory.

and adapting said program for controlling each of said vehicles to move to the work stations according to a schedule for delivering selected containers to selected stations before the quantity of parts at any selected station is depleted below a predetermined minimum.

7. The invention as defined in claim 6 including the step of:

providing a program for the computer system for determining from said carrier module data the quantity on each vehicle of parts having the same identification code, said program being operative for controlling the vehicles to move adjacent each other for the exchange of an empty container for a non-empty container between the vehicles for a given part identification code.

8. The invention as defined in claim 1 including the step of:

recording container transfer data including container identification codes, vehicle identification codes and work station identification codes for each deposit of a container from a vehicle to a work station and each pick up of a container from a work station to a vehicle and communicating said container transfer data to said computer system.

9. The invention as defined in claim 1 including the steps of:
- loading a storage module with a set of parts containers, said storage module having a compartment for each container and each compartment having a compartment address,
- recording on a second machine readable medium certain storage logical data including the part identification code and the quantity of parts in the container in each compartment address,
- reading the storage module data from said second recording medium into the computer system and storing it in a memory thereof, and providing a program for the computer system for determining from the carrier module data, storage module data and said count the quantity and location of each part.

10. The invention as defined in claim 1 wherein said step of keeping count includes:
- counting the quantity of missing and unusable parts of each work station.

11. A system for supplying parts for use at plural work stations in accordance with the number of parts at the respective work stations to thereby minimize the need for storage of parts at the work stations comprising:
- a receiving station,
- a plurality of work stations,
- a computer controlled vehicle adapted to move from station-to-station,
- a carrier module on the vehicle, said carrier module having a set of parts containers and a carrier module identification code and a compartment for each container, each compartment having a compartment address,
- each container being adapted to contain a quantity of parts having a part identification code,
- a recording medium for carrier module data associated with said carrier module and containing the carrier module identification code, the part identification code and the quantity of parts in the container at each compartment address,
- a computer system including terminal means at said receiving station for reading said recording medium into said computer system and storing the carrier module data in a memory of said computer system,
- means for keeping count of the quantity of parts and their identification codes at each work station and communicating said count to the computer system,
- said computer system including a data memory for storing data including the normal quantity of parts which will be used per unit of time at each work station and the respective identification codes of such parts,
- said computer system including a program memory holding a stored program for operating said computer system to produce guidance command signals for said vehicle to move it to the work stations according to a schedule for delivering selected containers to selected stations before the quantity of parts at any selected station is depleted below a predetermined minimum said stored program being adapted to determine said schedule from said count, said normal quantity stored in said data memory and said carrier module data.

12. The invention as defined in claim 11 wherein:
- said computer system comprises a host computer in communication with said data memory and said program memory,
- an on-board vehicle computer disposed on said vehicle,
- said vehicle computer being coupled with the guidance control system of the vehicle,
- and means for communicating said guidance command signal from the host computer to the vehicle computer.

13. The invention as defined in claim 12 wherein said means is a local control computer in communication with said host computer and with said vehicle computer.

14. The invention as defined in claim 12 wherein said vehicle includes a container transfer mechanism for moving a container from any of said compartments to an adjacent work station and for moving a container from an adjacent work station to any of said compartments.

15. The invention as defined in claim 12 wherein:
- said vehicle includes a container transfer mechanism including control means responsive to transfer command signals for moving a container from any of said compartments to an adjacent work station and for moving a container from an adjacent work station to any of said compartments, said vehicle computer being coupled with said control means and being programmed to produce transfer command signals in response to input signals from said host computer.

16. The invention as defined in claim 15 wherein:
- said terminal means being coupled with said host computer for communicating said carrier module data thereto,
- said host computer being programmed to update said carrier module data in accordance with said transfer command signals.

* * * * *